United States Patent [19]

McDaniel et al.

[11] Patent Number: 5,105,365
[45] Date of Patent: Apr. 14, 1992

[54] ENVIRONMENTAL COMPLIANCE SYSTEM

[75] Inventors: Timothy E. McDaniel, New Milford, Conn.; Gerard W. Langton, Wappinger Falls; Bruce P. Coleman, Glendale, both of N.Y.

[73] Assignee: Union Carbide Industrial Gases Technology Corporation, Danbury, Conn.

[21] Appl. No.: 611,939

[22] Filed: Nov. 13, 1990

[51] Int. Cl.$^5$ .............................................. G06F 15/46
[52] U.S. Cl. ...................................... 364/496; 364/550
[58] Field of Search ............... 364/401, 496, 550, 552, 364/569, 551.01

[56] References Cited

U.S. PATENT DOCUMENTS

| | | | |
|---|---|---|---|
| 4,878,175 | 10/1989 | Norden-Paul et al. | 364/401 |
| 4,943,929 | 7/1990 | Simonoff | 364/494 |
| 4,975,840 | 12/1990 | DeTore et al. | 364/401 |

OTHER PUBLICATIONS

"Managers Guide to SHEA Compliance Management System"—Mar., 1989.
"Assessment of Occupational Exposure Using One-Sided Tolerance Limits", American Industrial Hygiene Association Journal—R. M. Tuggle, May, 1982.

Primary Examiner—Salvatore Cangialosi
Attorney, Agent, or Firm—E. Lieberstein

[57] ABSTRACT

A system for assisting the implementation of an environmental compliance program using microcomputer hardware and software to automatically revise the test sampling frequency of potentially hazardous substances based on estimates of risk of exposure derived from sample data.

3 Claims, 33 Drawing Sheets

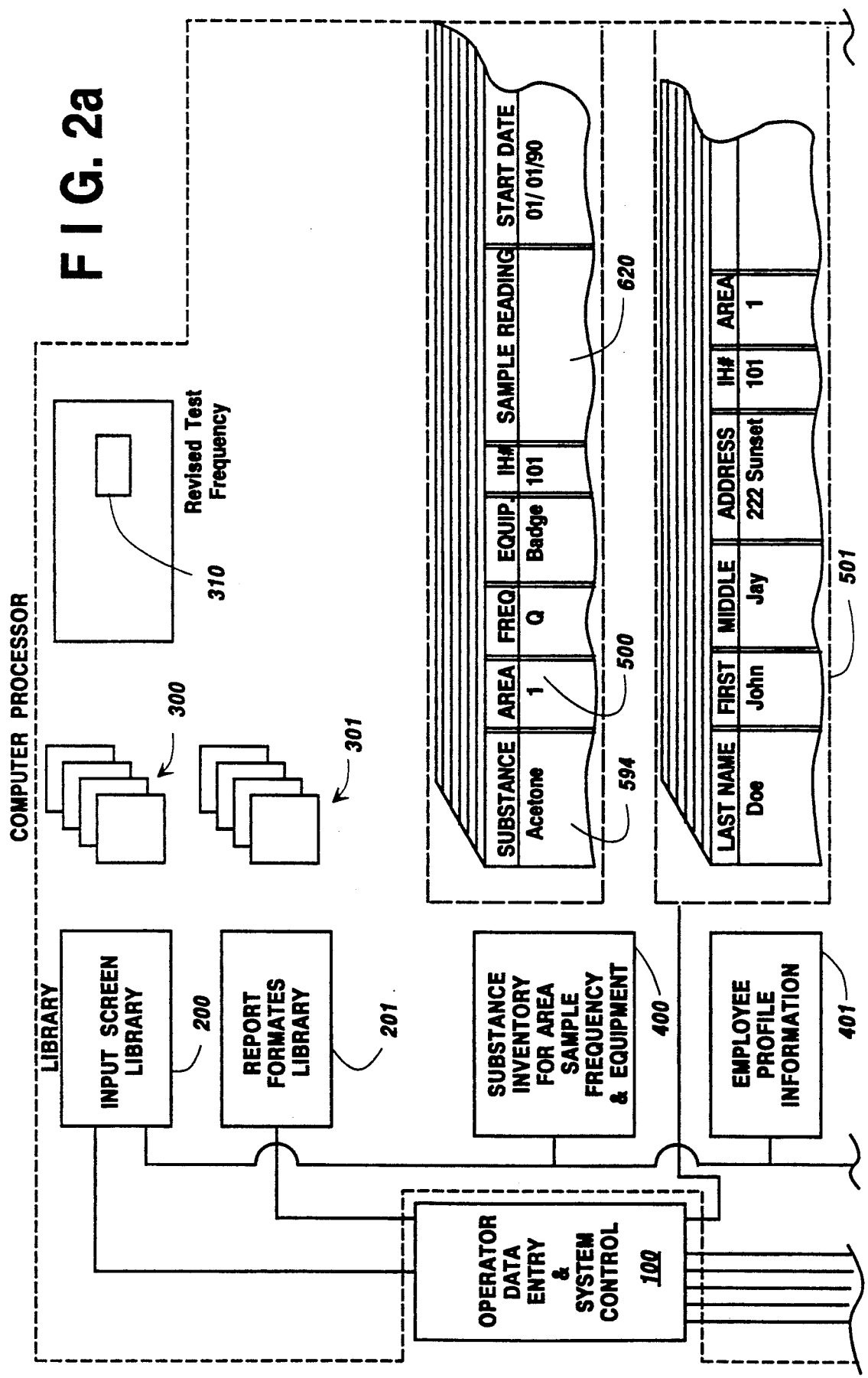

RISKS TABLE ⟵ 202

| SUBSTANCE | HAZARD CLASS | TLV | WORKER PROTECTION | DEGREE OF CONFIDENCE | UNIT OF M |
|---|---|---|---|---|---|
| Acetone | 1 | 750. | 0.95 | 0.95 | PPM |
| Aluminum Oxide | 1 | 10. | 0.95 | 0.95 | MG/M3 |
| Ammonia | 3 | 25. | 0.95 | 0.95 | PPM |
| Arsenic | 4 | 0.01 | 0.95 | 0.95 | MG/M3 |
| Copper Dust | 3 | 1. | 0.95 | 0.95 | PPM |
| Cyanogen | 3 | 10. | 0.95 | 0.95 | PPM |
| Diethylamine | 3 | 10. | 0.95 | 0.95 | PPM |
| Dimethylamine | 3 | 10. | 0.95 | 0.95 | PPM |
| Diborane | 4 | 0.1 | 0.95 | 0.95 | PPM |
| Ethyl Alcohol | 3 | 1000. | 0.95 | 0.95 | PPM |
| Ethyl Chloride | 1 | 1000. | 0.95 | 0.95 | PPM |
| Ethylene Glycol | 4 | 50. | 0.95 | 0.95 | PPM |
| Ethylene Oxide | 4 | 1. | 0.95 | 0.95 | PPM |
| Fluorine | 4 | 0.1 | 0.95 | 0.95 | PPM |

KFACTORS TABLE

| SAMPLE# | WORKER PROTECTION | DEGREE OF CONFIDENCE | KFACTOR |
|---|---|---|---|
| 3 | 95 | 95 | 5.145 |
| 4 | 95 | 95 | 4.202 |
| 5 | 95 | 95 | 3.707 |
| 6 | 95 | 95 | 3.399 |
| 7 | 95 | 95 | |
| 8 | 95 | 95 | 3.188 |

KPFACTORS TABLE

| SAMPLE# | WORKER PROTECTION | DEGREE OF CONFIDENCE | KPFACTOR |
|---|---|---|---|
| 3 | 95 | 95 | 0.639 |
| 4 | 95 | 95 | 0.743 |
| 5 | 95 | 95 | 0.817 |
| 6 | 95 | 95 | 0.875 |
| 6 | 90 | 90 | 0.921 |
| 7 | 90 | 90 | 0.755 |
| 8 | 90 | 90 | 0.783 |
| 9 | 90 | 90 | 0.808 |

203

ZONE, RISK, SAMPLE FREQUENCY

| hzdclas | ZONE | ZDESC |
|---|---|---|
| 1 | 1 | 3 SAMPLES EVERY SIX MONTHS. |
| 1 | 2 | 3 SAMPLES PER YEAR. |
| 1 | 3 | 1 SAMPLE PER YEAR. |
| 1 | 4 | 1 SAMPLE EVERY TWO YEARS. |
| 2 | 1 | 3 SAMPLES EVERY SIX MONTHS. |
| 2 | 2 | 3 SAMPLES EVERY YEAR. |
| 2 | 3 | 2 SAMPLES PER YEAR. |
| 2 | 4 | 1 SAMPLES PER YEAR. |
| 3 | 1 | 2 SAMPLES PER QUARTER. |
| 3 | 2 | 3 SAMPLES EVERY SIX MONTHS. |
| 3 | 3 | 2 SAMPLES EVERY YEAR. |
| 3 | 4 | 1 SAMPLE PER YEAR. |
| 4 | 1 | 3 SAMPLES PER QUARTER. |
| 4 | 2 | 2 SAMPLES PER QUARTER. |
| 4 | 3 | 2 SAMPLES EVERY SIX MONTHS. |
| 4 | 4 | 2 SAMPLES EVERY YEAR. |

FIG. 3(D)

EMPLOYEE MASTER UPDATE SCREEN

310

| | | |
|---|---|---|
| LOCATION: | 560 [1] | |
| LAST NAME: | [DOE] 561 . FIRST [JOHN] 556' . INITIAL [J] 563 . SEX: [M] 564 | EMPLOYEE NUMBER: [12] 562 |
| JOBCLASS ........ : [COMPUTER OPERATOR] . . . . . . . . . . DATE ENTERED JOB: 566 | | |
| CONTINUOUS SERVICE DATE: 565 ............ PLANT SERVICE DATE: | | |
| STREET: | | |
| STATE/PROVINCE: | ZIPCODE: 567 . CITY: 568 | PHONE: 569 |
| SPECIAL TEAM(Y/N): | | |

MANAGEMENT DATA INPUT - I. H. MONITORING /590

| | | |
|---|---|---|
| I. H. Inventory | B. | Add to substance (Physical Agent)/Area Job Inventory |
| | C. | Change substance (Physical Agent)/Area Job Inventory |
| | D. | Delete Substance (Physical Agent)/Area Job Inventory |
| I. H. Inventory | E. | Add to substance (Physical Agent)/Area Job History |
| | F. | Change substance (Physical Agent)/Area Job History |
| | G. | Delete Substance (Physical Agent)/Area Job History |
| Reports | H. | I. H. Monitoring Reports |

FIG. 6(B)

PICK - SUBSTANCE - TO - ADD - TO - INVENTORY 592

594
| 1,1,1 Trichloroethane | 1,3 Butadiene |
| Acetone | Aluminum Oxide |
| Ammonia | Arsenic |
| Arsine | Asbestos |

COMPLIANCE MANAGEMENT SYSTEM
IH MONITORING INVENTORY

SUBSTANCE (PHYSICAL AGENT): [1,1,1 Trichloroethane] ~594

AREA/JOB: [1] ~595

SAMPLING PLANNING PERIOD: [A (YEARLY )] ~596  PLANNED SAMPLES PER PERIOD: [5] ~597

EQUIPMENT: [BADGE] ~598

START DATE FOR STRATEGY REPORTING: [01/01/90]

********************************************************

HAZARD CLASS: [1] ~601    TLV: [350] ~602    UNIT OF MEASURE: [PPM] ~603

WORKER PROTECTION FACTOR: [0.95] ~604    DEGREE OF CONFIDENCE: [0.95] ~605

```
               MANAGEMENT DATA INPUT -- I.H. MONITORING

HCNC           A.   HCNC PROGRAM UPDATE

I.H.         B.   ADD TO SUBSTANCE (PHYSICAL AGENT)/AREA JOB
INVENTORY      C.   CHANGE SUBSTANCE (PHYSICAL AGENT)/AREA JOB
               D.   DELETE SUBSTANCE (PHYSICAL AGENT)/AREA JOB      3/7

I.H.         E.   ADD TO SUBSTANCE (PHYSICAL AGENT)/AREA JOB HISTORY
HISTORY        F.   CHANGE SUBSTANCE (PHYSICAL AGENT)/AREA JOB HISTORY
               G.   DELETE SUBSTANCE (PHYSICAL AGENT)/AREA JOB HISTORY

REPORTS        H.   I.H. MONITORING REPORTS

PICK - SUBSTANCE - (PHYSICAL-AGENT)-AREA JOB-
          10 *1,1,1 Trichloroethane AREA      1 *Acetone AREA2
           3 *Ammonia AREA3                   6 *asbestos
```

FIG. 7(A)

COMPLIANCE MANAGEMENT SYSTEM

AREA JOB: AREA 1
SUBSTANCE (PHYSICAL AGENT): 1,1,1 Trichloroethane
TLB: 350

| SAMPLE COMPLETION DATE | SAMPLE RESULTS | WITHIN GUIDELINES (Y/N) | SAMPLE NUMBER |
|---|---|---|---|
| 02/01/90 — 701 | 258 — 703 | Y — 705 | 123 |

HISTORICAL EQUIPMENT USED
BADGE

DO YOU WISH TO ADD EMPLOYEE'S MONITORED AT THIS TIME (Y/N):

At the prompt, select employee(s) by entering:

- their EMPLOYEE NUMBER (as many as you want - one at a time), then enter E
  to end inputting numbers

OR

- L to select from an employee list.

\* NOTE EMPLOYEE WILL APPEAR ON REPORT OR BE UPDATED WHEN MARKED WITH AN "X"

\*\*\*\*\*\* IF SELECTING BY EXCEPTION THEN ONLY MARK THOSE NOT TO BE UPDATED OR REPORTED.

| SELECT | LAST NAME | FIRST NAME | INIT | EMP # |
|--------|-----------|------------|------|-------|
| X      |           | FRED       | A    |       |
| X      |           | TOM        | B    |       |
| X      |           | RAY        | C    |       |

STATUS, INVENTORY, HISTORY REPORTS

A.
B.
C.
D.
E.
F.
G. TEST AND INSPECTIONS
H. INDUSTRIAL HYGIENE MONITORING
I.

FIG. 8(B)

MANAGEMENT REPORTS - I.H. MONITORING

I.H. MONITORING

A. I.H. MONITORING INVENTORY REPORT
B. I.H. MONITORING HISTORY REPORT BY SUBSTANCE OR AREA JOB CLASS
C. I.H. MONITORING HISTORY REPORT BY EMPLOYEE
D. I.H. MONITORING NOTIFICATION EXCEPTION REPORT
E. I.H. MONITORING NOTIFICATIN EXCEPTION WORK ORDER
F. I.H. MONITORING SPREADSHEET
G. I.H. MONITORING STRATEGY REPORT

I.H. MONITORING INVENTORY FILE
08/06/90

| SUBSTANCE (PHYSICAL AGENT) | AREA JOB / EQUIPMENT | SAMPLING PERIOD | SAMPLES PERIOD | START DATE |
|---|---|---|---|---|
| 1,1,1 Trichloroethane TLV: 350. PPM | AREA1 NONE1 | A | 5 | 01/01/90 |
| Acetone TLV: 750. PPM | AREA2 NONE2 | W | 3 | 01/02/90 |
| Ammonia TLV: 25. PPM | AREA3 NONE2 | M | 2 | 01/03/90 |
| Asbestos TLV: 0.2 FCC | AREA4 NONE4 | Q | 1 | 01/04/90 |

FIG. 8(C)

```
==================================================
  CHOOSE SORT SEQUENCE FOR REPORT
  1: SORT BY (SUBSTANCE/AREAJOB) IN DESCENDING ORDER
     BY SAMPLE DATE
  2: SORT BY (AREAJOB/SUBSTANCE) IN DESCENDING ORDER
     BY SAMPLE DATE
==================================================
```

FIG. 8(D)

```
==================================================
  CHOOSE SORT SEQUENCE FOR REPORT
  1: SORT BY (SUBSTANCE/AREAJOB) IN DESCENDING ORDER
     BY SAMPLE DATE
  2: SORT BY (AREAJOB/SUBSTANCE) IN DESCENDING ORDER
     BY SAMPLE DATE
  ENTER YEAR (YY) DESIRED OR  A  FOR ALL YEARS:A
==================================================
```

FIG. 8(E)

```
┌─ CHOOSE SORT SEQUENCE FOR REPORT ─────────────────────┐
│  1:   SORT BY (SUBSTANCE/AREAJOB) IN DESCENDING ORDER │
│       BY SAMPLE DATE                                  │
│  2:   SORT BY (AREAJOB/SUBSTANCE) IN DESCENDING ORDER │
│       BY SAMPLE DATE                                  │
│  ENTER YEAR (YY) DESIRED OR  A  FOR ALL YEARS:A       │
└───────────────────────────────────────────────────────┘
```

FIG. 8(F)

```
┌─ CHOOSE ALL OR SELECTED SUBSTANCE (PHYSICAL AGENT) FOR REPORT ─┐
│   (1)  1:   SELECT ALL SUBSTANCE (PHYSICAL AGENTS)             │
│   (2)  2:   SELECT INDIVIDUAL SUBSTANCE (PHYSICAL AGENT)       │
└────────────────────────────────────────────────────────────────┘
```

FIG. 8(G)

I.H. MONITORING
SUMMARY OF AREA/JOB EXPOSURES
BY SUBSTANCE PHYSICAL AGENT 1,1,1 Trichloroethane

| SAMPLE NO | AREA/JOB | EMPLOYEE NAME | SAMPLE DATE | RESULTS |
|---|---|---|---|---|
| 670 | AREA1 | | 07/01/90 | 263. |
| | | | TLV. | 350. PPM |
| COMMENTS: | | | | |
| 567 | AREA1 | | 06/01/90 | 349. |
| | | | TLV: | 350. PPM |
| COMMENTS: | | | | |
| 567 | AREA1 | | 06/01/90 | 349. |
| | | | TLV: | 350. PPM |
| COMMENTS | | | | |

FIG. 9(A)

SCMS I.H. MONITORING
SUMMARY OF AREA/JOB EXPOSURES
BY EMPLOYEE

J. J. DOE

| SUBSTANCE | AREA/JOB | SAMPLE DATE | RESULTS |
|---|---|---|---|
| Acetone | AREA2 | 02/02/90 TLV: | 790.00 750. PPM |
| COMMENTS: | NONE FOR AREA2 S1 | | |
| Acetone | AREA2 | 06/02/90 TLV: | 777.000 750. PPM |
| COMMENTS: | NONE FOR AREA2 S5 | | |
| 1,1,1 Trichloroethane | AREA1 | 02/01/90 TLV: | 258.000 350. PPM |
| COMMENTS: | | | |

I.H. AREA OR JOB CLASSIFICATION MONITORING
NOTIFICATION EXCEPTION REPORT

350

| SUBSTANCE PHYSICAL AGENT | AREA/JOB CLASSIFICATION | SAMPLE DATE | SAMPLE RESULTS | TLV |
|---|---|---|---|---|
| 1,1,1 Trichloroethane | AREA1 | 02/01/90 | 258.000 | 350.000 |
| | | | UOM: PPM | |

EMPLOYEES MONITORED

J. J. DOE
A. Z. LFTZ
B. Z QDFZ

I.H. MONITORING
EMPLOYEE NOTIFICATION REPORT

NAME: J.J. DOE
AREA/JOB AREA1
SAMPLE DATE: 02/01/90
SAMPLE NUMBE:123

ANALYTICAL RESULTS

| SUBSTANCE/PHYSICAL AGENT | 8 HOUR TIME WEIGHTED AVERAGE | TLV UOM |
|---|---|---|
| 1,1,1 Trichloroethane | 258.000 | 350.000 PPM |

Comments: NONE AT THIS TIME

EMPLOYEE SIGNATURE _____ DATE _____
AUTHORIZED SIGNATURE _____ DATE _____

FIG. 9(D)

```
 ┌─────────────────────────────────────────────────────────────────────┐
 │  ┌─────────────────────────────┐                                    │
 │  │ Edit Expression Customize Draw│         340                      │
 │  └─────────────────────────────┘                                    │
 │                     320 ── FORM DEFINITION MENU                     │
 │                                                                     │
 │  S LOCATION E                                                       │
 │  ACCIDENT/INCIDENT # : S           E    ACTION PLAN COMPLETE DATE: S    E
 │  ACCIDENT/INCIDENT DATE: S       E                             335 ─┘
 │  S─────────────ACCIDENT/INCIDENT DESCRIPTION─────────────────────W
 │  │                                         330                     │
 │   330                              325                             │
 │                                                                    E
 │  CLASSIFICATION OF ACCIDENT (I,P,S,K,O): E
 │    I = INJURY OR ILLNESS
 │    P = PROPERTY DAMAGE
 │    S = SPILL OR RELEASE
 │    K = KEY INCIDENT (ACCIDENTS OTHER THAN PROPERTY DAMAGE, INJURY/ILLNESS, OR
 │        SPILL/RELEASE WHERE NO ONE IS INJURED BUT WHICH HAVE A HIGH POTENTIAL FOR
 │        PROPERTY DAMAGE OR MAJOR INJURY FROM ONE OF THE 5 AGENTS.)
 │    O = OFF THE JOB ACCIDENT
 │
 │  S─────────────────────EXTENT OF PROPERTY DAMAGE──────────────W
 │  │                                                            E
 │   330
 │
 │  [ESC] Return   [F3] Review    [F7] Prev table   [Shift-F10] More
 │  Form: ACC1                                      Table: ACCINV
 └─────────────────────────────────────────────────────────────────────┘
```

```
S LOCATION E     320'  ---  CRAN D'AJOUT  ---        S DATE E
                       ACCIDENT/INCIDENT/DVERSEMENT/FUITE      335'
         DESCRIPTION BRVE                  DATE        FIN
                        325'              ACC/INC    PLAN ACT
S E'    6      330'                  E    S   E    S    E
                                                  330'      335'

CLASSIFICATION DE L'ACCIDENT(I,P.S,K)EE
    I = BLESSURE OU MALADIE
    P = DOMMAGES MATRIELS
    S = DVERSEMENT OU FUITE
    K = INCIDENT CL (ACCIDENTS AUTRES QUE DOMMAGES MATRIELS, BLESSURE/MALADIE, OU
        DVERSEMENT/FUITE SANS BLESS, MAIS PRSENTANT DES RISQUES LEVS DE DOMMAGES
        MATRIELS OU DE BLESSURE GRAVE DUS UN DES 5 AGENTS).

TENDUE DES DOMMAES MATRIELS:
 S                                                         W      E

[ESC] Return   [F1] Insert    [F2] Delete   [F3] Review    [Shift-F10] More
Form: ACC1     Edit           Table: ACCINV           Page 1 < 1, 1 >

SAVE THIS FORM    Y □    N □

DISCARD THIS FORM Y □    N □

RETURN THIS FORM  Y □    N □
```

ENVIRONMENTAL COMPLIANCE SYSTEM

FIELD OF THE INVENTION

The present invention relates to a system to assist the implementation of an environmental compliance program. More particularly the present invention is directed to an automatic system using microcomputer hardware and software to automatically revise the schedule for test sampling frequency of potentially hazardous substances in an automated industrial health monitoring system based on estimates of the risk of exposure derived from the sample data. The present invention also includes an embodiment directed to the translation of text language of crated forms reports and screens.

BACKGROUND OF THE INVENTION

A computerized system for managing site specific environmental compliance which addresses the more stringent of federal, state, local and company standards has been developed and is in use at many locations and is outlined in the publication "Managers Guide to SHEA Compliance Management System"—March 1989" attached as an appendix "A" hereto. In this compliance system, individual industrial sites are provided with microcomputer hardware and a customized software program for managing databases structured to receive site—specific data regarding employees at the site, and potentially hazardous materials which are or may be present at designated physical locations at the site and which may be encountered by employees carrying out the functions of particular job category assignments. For the purpose of establishing strict compliance with designated regulations regarding exposure to potentially hazardous materials, test sampling of such materials is undertaken periodically at industrial sites and the test result data are utilized in forming a judgment as to appropriate compliance strategies at the respective industrial sites. It is fully accepted that the results obtained from such test sampling are key elements in developing compliance strategies, in particular, in addressing situations before compliance difficulties arise.

SUMMARY OF THE INVENTION

The present invention is an automated system for automatically revising the test sampling frequency of tests performed in order to implement an industrial hygiene strategy. With such tests, measured values are obtained of the amount present of each of a plurality of potentially hazardous substances at each of one or more designated physical parts, i.e. locations of an industrial site, where the exposure to potentially hazardous materials for the ambient environment at the site is periodically tested e.g. by techniques such as passive badges, air sample pumps using filter cassettes, sorbent tubes and blood samples taken from employees, and the results recorded for the presence of measurable amounts of such potentially hazardous substances and compared with tolerance level values for such substances. Also the names of the persons regularly employed at each part of the site are recorded and such records updated as required.

The test sampling frequency strategy revision system of the present invention operates in combination with the afore-described preexisting automated system which, in part, includes a computer, preferably a microcomputer, with a memory device, main memory, e.g. a part of the computer, and additionally a hard disk drive, i.e. computer secondary storage memory, in which is stored various libraries, in the form of databases, such as: a library to receive the name, address, site work area and/or job designation for each person regularly employed at the site; a library to receive data for each of the potentially hazardous substances at a designated part of the site or a designated job category, and current test sampling frequency strategy for the potentially hazardous substances; and a library for test sample data for each designated facility location and each employee working at such location. Also provided are libraries for input formats to enable the local entry of data into the aforementioned employee profile and site profile libraries, and report formats for employee notification and reports to implement industrial hygiene strategies. The computer and memory provide program control to enable review of information in the form of a logical structure of data and the generation of reports to implement industrial hygiene strategies.

In the present invention, additional databases in a logical structure are provided in libraries which are stored in computer memory including tabulated statistically established data relating to estimates of appropriate test sampling frequency and tabulated data for the risk rating and designated tolerance level for the potentially hazardous substances. Additional input and report formats are also provided. The aforesaid additional databases and input and report formats in computer memory are subject to computer program control which applies software functions to establish revised estimates of optimum test sampling frequency for potentially hazardous substances for purposes of industrial hygiene strategy.

BRIEF DESCRIPTION OF THE DRAWINGS

FIGS. 2(a) and 2(b) constitute a flow chart including the system of the present invention;

FIGS. 3(a)–(d) are tables in a logical structure which are stored in computer memory and used in the operation of the system of the present invention;

FIGS. 5(a)–9(f) show a sequence of screens which occur in the course of practicing a particular embodiment of the present invention;

FIG. 13 is an exemplary form illustrated as a form to be translated;

FIG. 14 is an exemplary translated form; and

DETAILED DESCRIPTION

Figure 1:
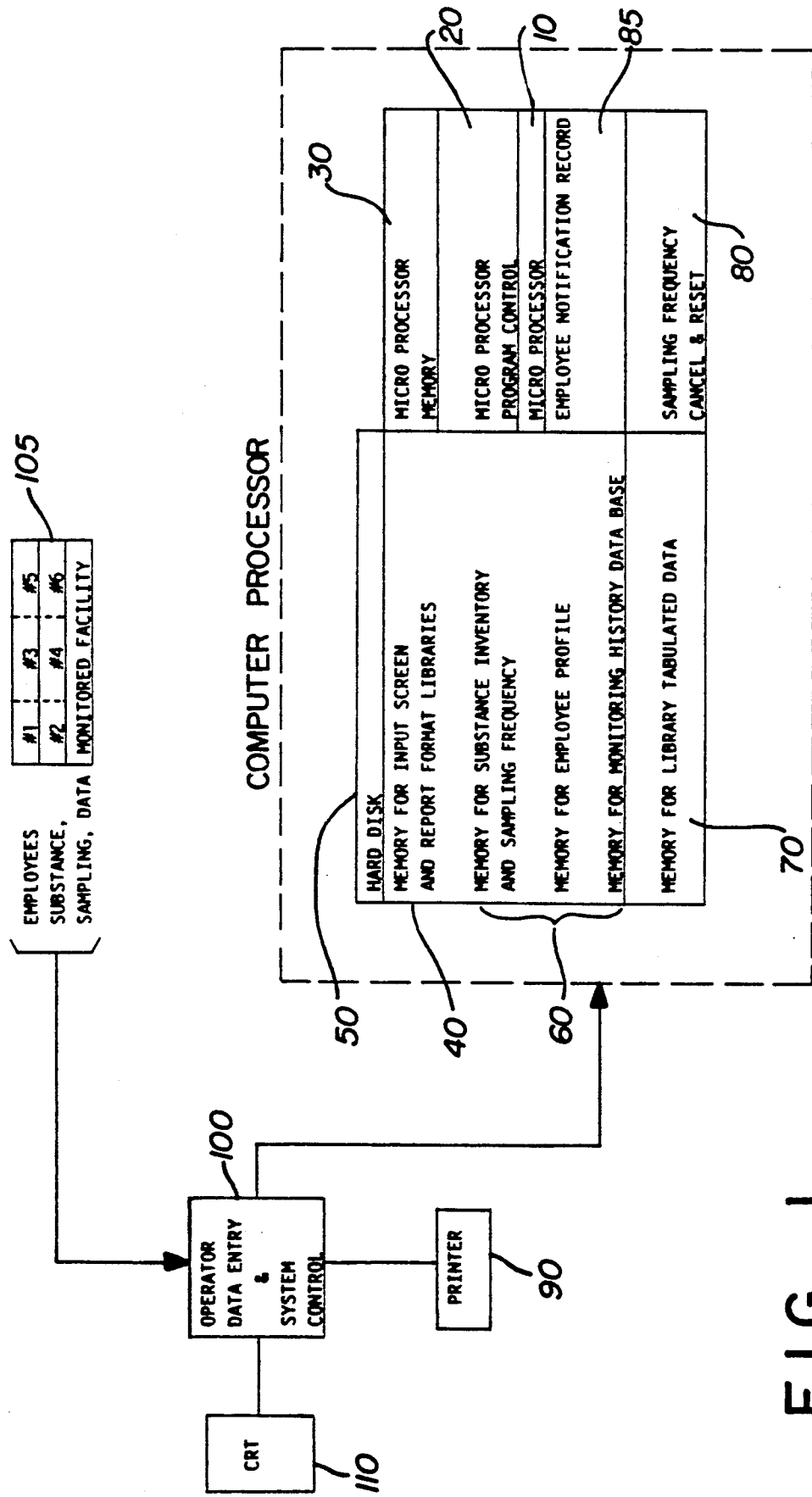
FIG. 1 is a block diagram of the hardware, and software control which includes the system of the present invention.

With reference to the drawing, FIG. 1 shows, somewhat schematically, a block diagram of a system including the present invention in which a microprocessor is indicated at 10, suitably an IBM AT, PS/2 Model 50 with minimum 640 KB Memory and minimum 20 MB hard disk, running DOS 3.1 or greater. Microprocessor program control 20 utilizes a compatible database creation and management software such as the Microrim R:Base* for DOS, Version 2.11x which runs on microprocessor 10. Microprocessor memory 30, including ROM and RAM in conjunction with program control 20 creates input and report format libraries 40 for storage in hard disc 50 and also, as indicated at 60, employee and site profile databases and a history monitoring database which are inputted on site for exemplary locations #1–#6 of monitored industrial facility 105 and managed by operation of program control 20. Also provided in storage in hard disk 50, for utilization by program control 20, are numerical data tables as represented at 70 which under the guidance of program control 20 in conjunction with the databases indicated at 60, to enable the revision, reporting and re-setting of test sampling frequency as indicated at 80 and employee notification as indicated at 85, reports being generated at printer 90, either automatically or as required by an operator of data entry and system control 100, for example by means of a keyboard device, by which the operator also inputs the data for the databases indicated at 60 and initiates program control 20. A CRT 110 is available to guide data entry into the databases and implement menu commands as hereinafter more fully described.

* Trademark of Microrim, Inc.

Figure 2B:
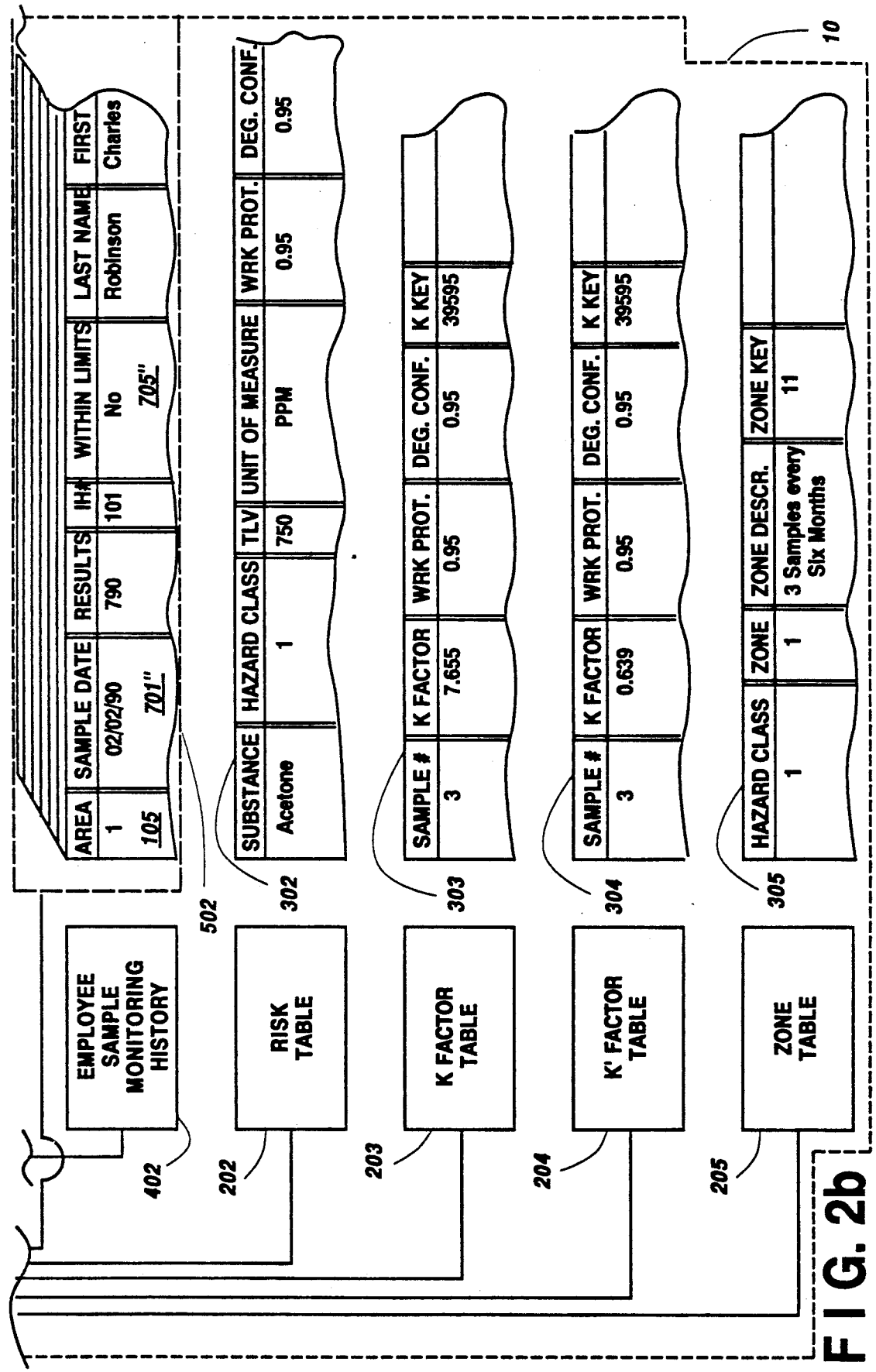

With reference to the flow diagram of FIG. 2, the libraries created as tables in the relational database program (stored in microprocessor memory 30, i.e. a main memory) are indicated at 200–205 and representations of the contents of these libraries, which after being created are stored at hard disk 50 (secondary storage) are indicated at 300–305. The databases, initially empty of data, are indicated at 400, 401 and 402 with representations of portions of completed records in the respective databases stored at hard disk 50 indicated at 500, 501 and 502.

In operation of the present invention, input screens 300, hereinafter specifically illustrated and described in connection with FIGS. 5(b), 6(b), 6(c), and others, are created as forms using relational database management software such as the R:Base* from Microrim noted above using application routines installed in the database management software. For the input of data to database 401 and 400, the input screens, i.e. forms, 310, 312, 314, shown more specifically in FIGS. 5(b), 6(c), 7(b), are sequentially selected at data entry and system control 100, and data for all employees, substances and site profile information are entered into the respective databases, 401 and 402 to construct records 501 and 502. Database record 502 receives its input by way of functions of data entry and system control 100 and upon the entry of data from sample testing as indicated in FIG. 7(b) hereinafter discussed.

*Trademark of Microrim, Inc.

Figure 4:
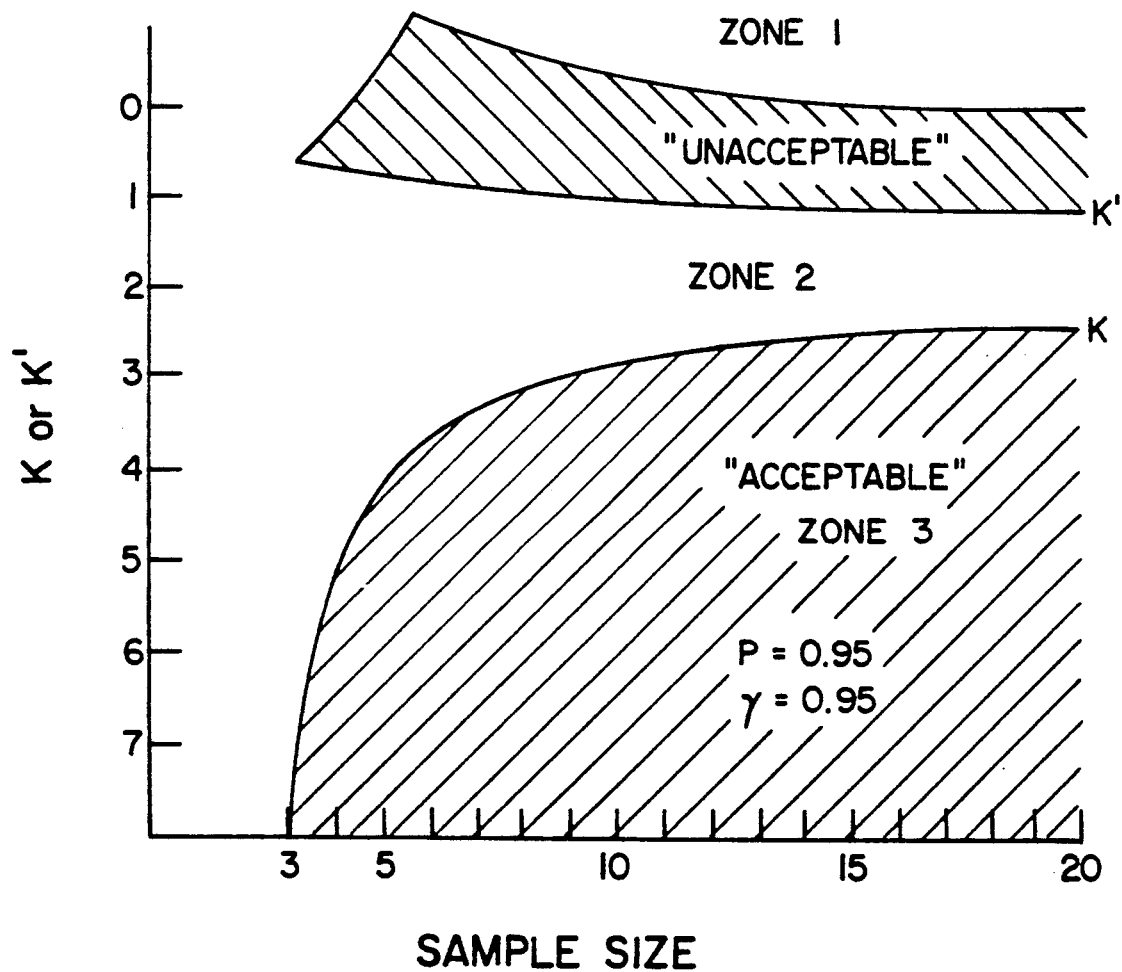
FIG. 4 is a cartesian plot of discrete statistically determined regions of industrial hygiene exposure potential.

The tables for libraries 202–205 are established from pre-existing statistically determined and empirical data. Representations of these tables are shown in FIGS. 3(a) to 3(d). The cartesian plot of exposure potential of FIG. 4 shows discrete regions designated as Zone 1 and Zone 3 which are defined by K and K' one sided tolerance values of Tables 204 and 203 of FIGS. 3(b) and 3(c) which are based on the published work in American Industrial Hygiene Association Journal "Assessment of Occupational Exposure Using One-Sided Tolerance Limits"—R.M. Tuggle, May, 1982. The plot of FIG. 4 has been found to represent an effective tool in establishing industrial hygiene strategies by correlating measured test sample data with the zones which represent estimates of acceptable and unacceptable sampling frequency.

Figure 9E:
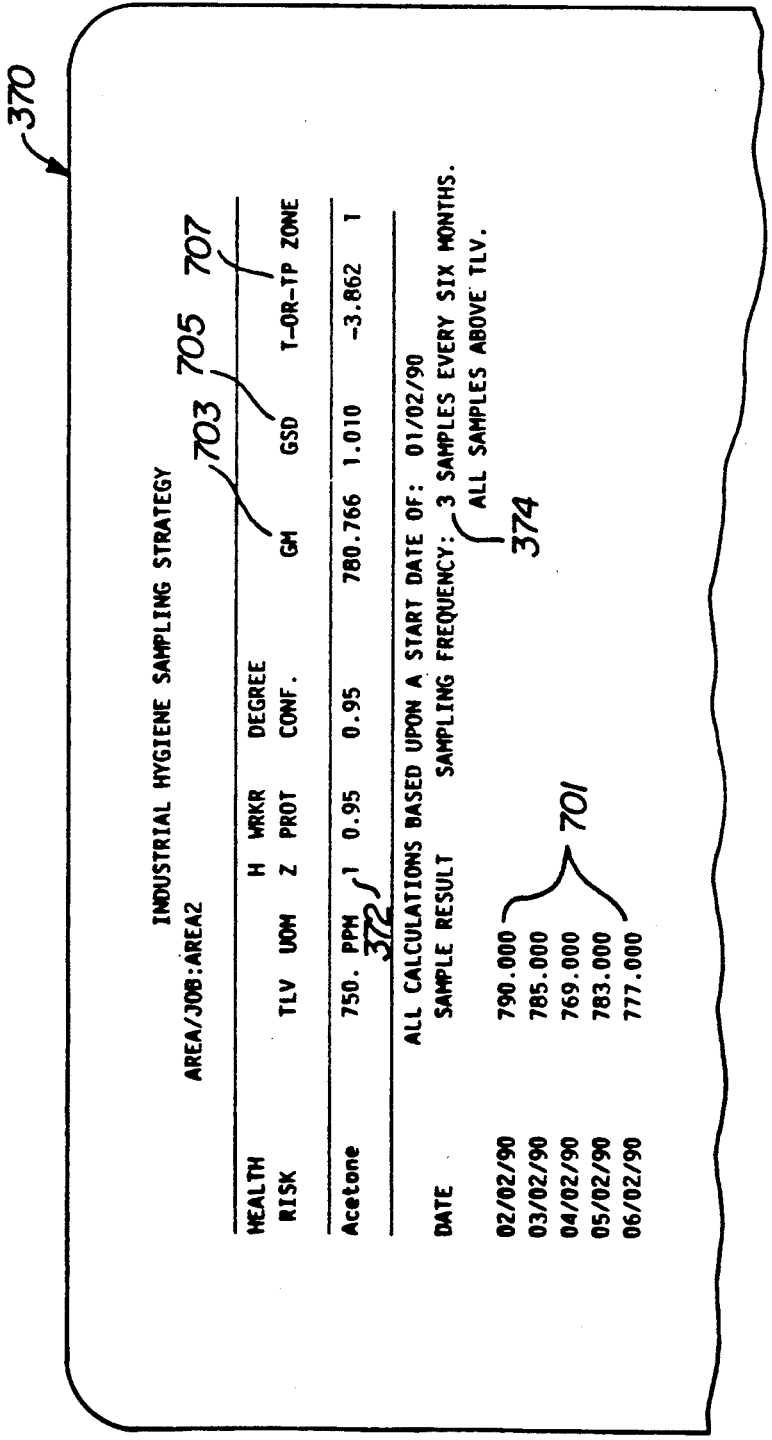

In the compliance method of the present invention, formats for libraries 200 and 201 are created and stored in the memory of hard disk 50 as are the numerical, empirical and statistical data tables 202–205. After entry of employee and site profile data in databases 400 and 401, subsequent test sampling of substances included in database 400 are accomplished at a pre-determined, initially estimated frequency, e.g. a given number of tests per quarter year, per week, per month, which is pre-set by operator data entry and system control 100 into database 400 and stored on hard disk in computer memory and available for use in computer main memory. Data from the subsequent test sampling is entered into databases 402 and 400 by way of data entry and system control 100. When at least a minimum number of test sampling results, i.e. threshold number, have been entered by operator data entry and system control into the databases, system control 100 directs the computer, i.e. microprocessor, to compute an estimated optimum future sampling frequency on the basis of the measured data and the statistically based data in the tables of libraries 202–205, utilizing data management functions of data entry and system control 100. The threshold number of test samples is derived from the K and K' factors tables (Appendix "B" and "C"), FIGS. 3(b) and 3(c) and after the threshhold number of test samples has been achieved, the computer re-calculates an estimated test sampling based on the cumulative test sampling data. The computed estimated test sampling frequency is reported as indicated at 310 in FIG. 2 and at 374 in FIG. 9(e) hereinafter discussed in detail. The revised test sampling frequency is computed concurrently with computation of the average of all of the test sample values, which is reported to the employees working at the site location of the measurements pursuant to procedures in effect prior to the present invention and which are discussed hereinafter in connection with FIG. 9(d).

Reference is now made to FIG. 3(a) and the drawings following this figure which illustrate a specific sequential example of the present invention using a relational database software, e.g. R:Base* (Microrim) software in the operation of operator data entry and system control 100. Relational database creation and management software employs a data structure in which all data, including screens and formats, are represented as tables (rows and columns, or fields) and internal operators are provided by the software for manipulating data when in the form of tables and when each table has a unique key field. Using pre-defined commands the tables can be joined i.e. combined into a third table in which rows are based on comparison of column values from the original tables and rows that satisfy the comparison are merged to form a row in the new table. Also, a new table can be projected, i.e. created from an existing table and the new table can be sorted as wanted and can be restricted to contain only specified columns and rows. A union of two tables can be provided by combining two tables having at least one common column with the new table having a row corresponding to every row in the original tables with the identical values in the common columns being combined in the table. Also, a third table can be provided from two existing tables to have only rows in which common columns from one existing table are identical to counterparts in the second existing table. A relational database supports a "query" database language in which the user utilizes commands (also known as "statements") that will cause data manipulation to occur i.e. retrieval, modification, deletion and insertion. The relational database system, R:Base* (Microrim) uses various queries which are functionally compatible with the structured query language, SQL*, implemented by IBM on its machines for database management and pre-defined mathematical functions are also available for arithmetic calculations and to obtain logic values, averages, maximum and minimum of listed values, and greater then, less than and equal logical functions and the foregoing can be used with date and time functions (Appendix "E").
* Trademark of Microrim, Inc.
* Trademark of IBM In FIG. 3(a), risks table 202 (Appendix "D"), shown also in the flowchart of FIG. 2, is a tabulation in alphabetical order of potentially hazardous substances which may be present at one or more of the locations at which a compliance system, as herein described, is in place. For each tabulated substance there is assigned a numerical "Hazard Class" designation ranging from 1 to 4, a numerical TLV value ("Tolerance Level Value") with appropriate units of measure and worker protection and degree of confidence factors (Appendix "F"). The numerical "Hazard Class" ratings indicate increasing hazard with increasing number designation and the TLV values are at least as stringent as the most stringent requirement of an agency or company regulation. The protection and confidence factors are used in the computer operation in obtaining the appropriate computation of substance sampling frequency.

- The values for risks Table 202 of FIG. 3(a) are entered into the memory of microprocessor 10 at hard disk 50 under the guidance of operator data entry and system control 100 and the database creation and management software and reside as a table available for interaction with the tables of the databases which will be created as hereinbelow described. The K Factors Table 204 of FIG. 3(b) and the KP(K') Factors Table 203 of FIG. 3(b) are similarly installed at hard disk 50. The values in these tables have been extracted from the boundaries of Zone I and Zone III of the cartesian plot of FIG. 4 which displays these discrete mutually exclusive zones.

The zone, risk, sample frequency Table 205 (based on the above-mentioned work in "American Industrial Hygiene Association Journal"—Tuggle, May 1982) of FIG. 3(d) listing hazard class, zone and estimated sampling frequency is installed at hard disk 50 in the same manner as Tables 202, 203 and 204 and all of these tables are available to be utilized and interact with the relational databases hereinafter described under the guidance of operator data entry and system control 100 and its relational database management software.

Input screens 310, 312 and 314 of FIGS. 5(b), 6(c) and 7(b) are created using a subroutine of the database creation and management software application which permits the creation of an application without requiring programming. With R:Base* (Microrim) the application "Forms Express"* is available for this purpose and the input screens 310, 312, 314 are installed in Table 200 at hard disk 50 for use in connection with the databases hereinafter described through the use of data entry and system control 100 under the guidance of database management software.
* Trademark of Microrim, Inc.

Figure 9F:
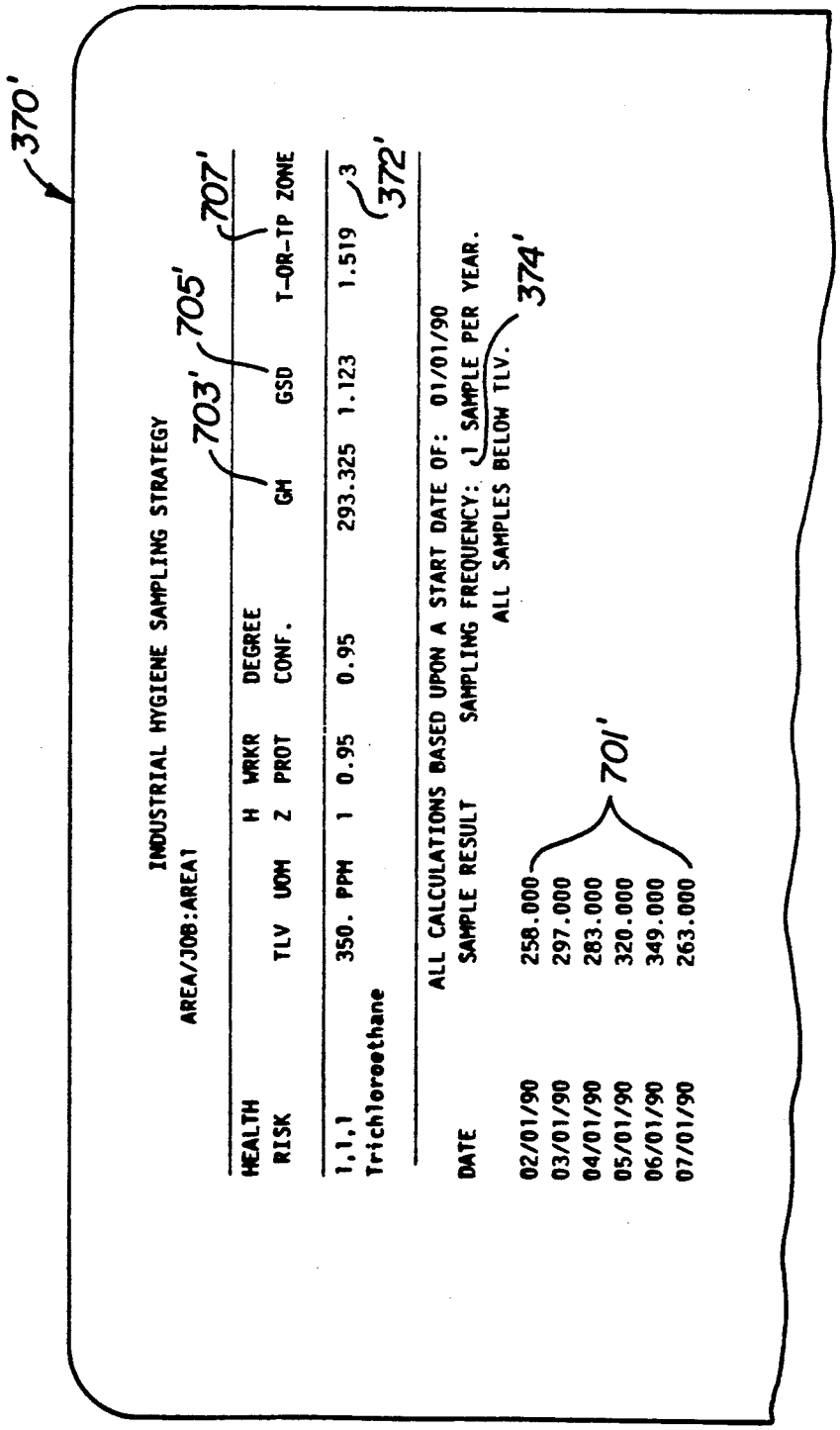

Report formats (320) FIG. 8(c), (330) FIG. 9(a), (340) FIG. 9(b), (350) FIG. 9(c), (360) FIG. 9(d), (370) FIG. 9(f) are created using a subroutine of the database creation and management software i.e. a format generator application which permits the creation of such an application without programming. With R:Base* (Microrim) the application "Reports Express"* is available for this purpose. The above-noted report formats are installed in Table 201 at hard disk 50 for use in connection with the databases 400, 401 and 402 shown in the flow diagram of FIG. 2.
* Trademark of Microrim, Inc.

Figure 5A:
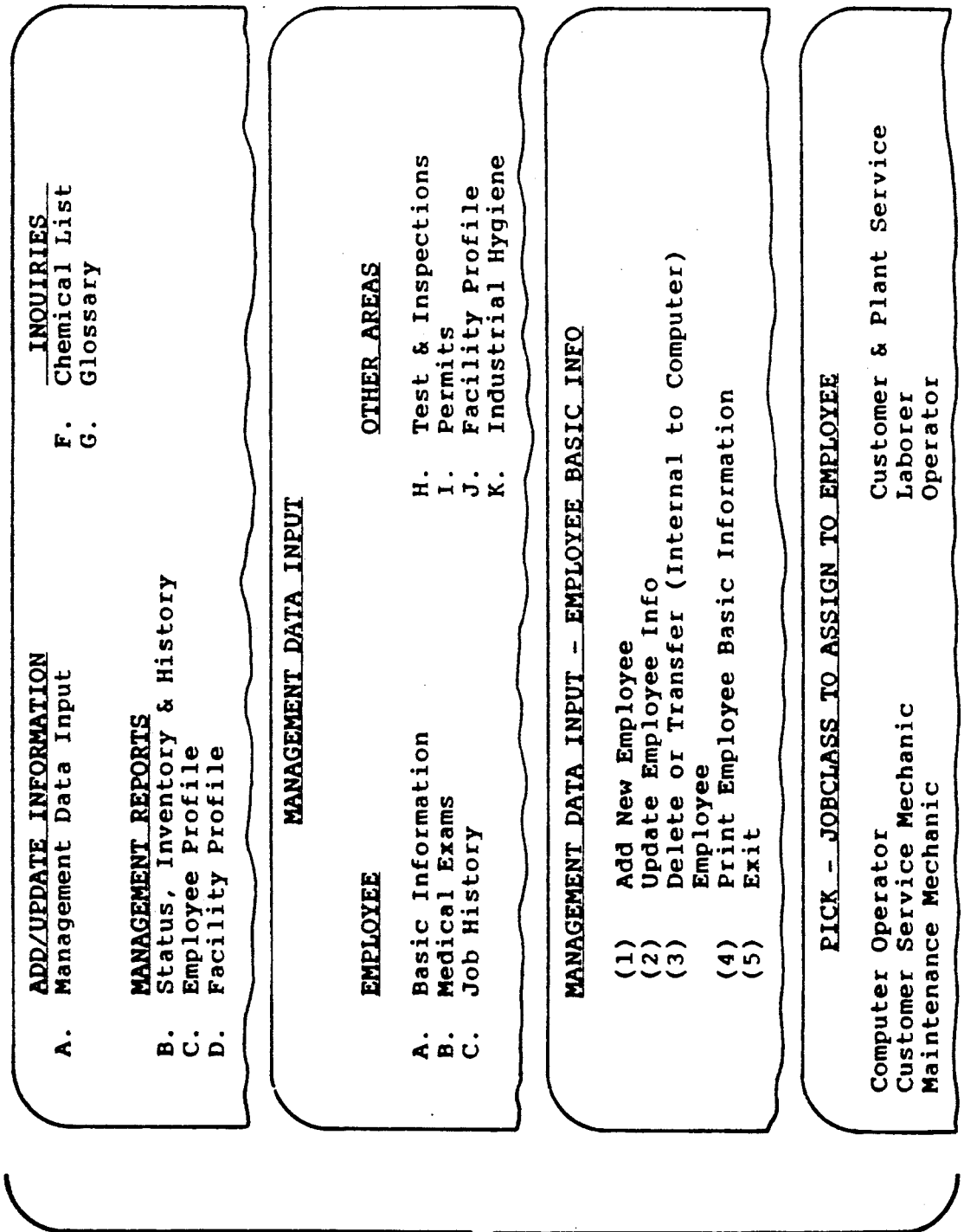

In creating the above-mentioned databases 400, 401, 402 the main menu commands and the submenus of FIG. 5(a) and the figures following are utilized; these menu commands are created, for a particular database, using a subroutine developed from an application of the database creation and management software; in the use of R:Base* (Microrim) it is "Application Express"*. With reference to FIG. 5(a), Employee "Basic Information "550" is selected followed by "Add New Employee" 552 and a "Job Class" pick 554 is automatically made available from pre-established table of job descriptions at hard disk 50. After making the applicable "pick" e.g. "computer operator" (556) input screen 310 of FIG. 5(b) automatically appears in the screen of CRT 110 (FIG. 1) with "computer operator" (556) automatically entered in the "job class" field as is the "location number" 560. The data for fields 561-569 are entered locally, e.g. by keyboard at data entry and system control 100 (FIG. 1) and a record such as 501 is created in database 401 as illustrated in the flow diagram of FIG. 2. Additional records are created for all employees at the facility to establish the database 401 which will receive, as a further data input an "IH" number, indicated at 575 in FIG. 2. An "IH" number is automatically assigned, in numerical sequence, by the computer processor guided by data entry and system control 100 upon the entry of each substance in database 400 to create records such as 500 as hereinafter described. The placing of the "IH" number, and the "location" designation 560 in the records of respective databases enables the concatenation of the databases by the data management software into the desired report formats hereinafter described.
* Trademark of Microrim, Inc.

The selection of "Industrial Hygiene" (588) of FIG. 5(a) followed by "Add to Substance" (590) of FIG. 6(a) and a "Substance-to-Add" pick (592) of FIG. 6(b) is automatically made available from input screens library 200. After making the applicable "pick" e.g. "1,1,1, Trichloroethane" (594) of FIG. 6(b), input screen 312 of FIG. 6(c) automatically appears at CRT 110 (FIG. 1) with "1,1,1, Trichloroethane" (594) automatically entered in the "substance" field. The data for fields 595-599 are entered locally, e.g. by keyboard at data entry and system control 100 (FIG. 1) and a record such as 500 is created for database 400. The sample planning period field entry (596) and "Planned Samples per Period" field entry (597) are initial estimates of a suitable test sampling frequency for the particular substance at the particular area, i.e. part of the industrial facility, and this initial estimate of test sampling frequency is also automatically entered in the monitoring report 320 of FIG. 8(c) until replaced by a different value.

In a particular embodiment of the present invention the pre-determined test sampling frequency can be initially pre-set at a value which is at least the highest recommended rate for the substance, i.e. at least as frequent so that the threshold number of test samples is rapidly achieved and an analysis promptly performed.

The field entries for fields 601–605 are automatically entered by operation of data entry and control 100 from Table 202 (FIG. 3) and a record such as 500 is created in the database 400 as illustrated in the flow diagram of FIG. 2. Additional records corresponding to 500 are created for all substances at, or likely to be at the monitored facility 105, to establish the database 400 which will receive, as further data inputs, using input screen 314 of FIG. 7(b) following selection of "Add to substance—Job History" 317 of Table 7(a), the values obtained from actual test sampling for the respective substances as indicated at 620 of the flow diagram of FIG. 2. With further reference to FIG. 7(b), the fields 701 "Sample Completion Date, 703 "Sample Results" and 705 "Within Limits" are keyboard entries at data entry and system control 100 (FIG. 1) and this data is entered at 620 of database 400 and also automatically entered in database 402 at 701', 702', 705' indicated in FIG. 2. The IH number "575" was automatically generated on entry of the "substance" 594 and also automatically entered by computer operation in the respective databases 401 and 402 so that the "IH" number column is common to all tables of the databases to enable concatenation of these tables in desired report formats.

As additional measured sample test data is obtained and entered in the databases, values for K and KP (K') are generated from tables 204 and 203 of FIGS. 3(b) and 3(c) when at least the threshold number of sample values of these tables have been entered and stored in computer memory, and a value for an "Exposure Potential" parameter, "T", is then computed using the stored measured sample values with mathematical functions of the relational database management software for the following relationship:

$$T = \frac{\text{Log}_{10}(TLV) - (\text{Log}_{10} GM)}{\text{Log}_{10}(GSD)}$$

where:
"TLV" is tolerance level from Table 202 (FIG. 3) for the substance sampled;
"GM" is the geometric mean of the measured value of the individual samples at or above the threshold number;
"GSD" is the geometric standard deviation for these samples.

If the value of T < K' i.e. it lies in ZONE 1 of FIG. 4 then employee exposure is not below the TLV for at least 95 percent of the time. If however T > K i.e. it lies in ZONE 3 of FIG. 4, then employee exposure is below the TLV for at least 95 percent of the time. If the value of T value is between the K and K' values i.e. it lies in ZONE 2, then employee exposure situation is uncertain due to lack of sufficient data.

Figure 10A:
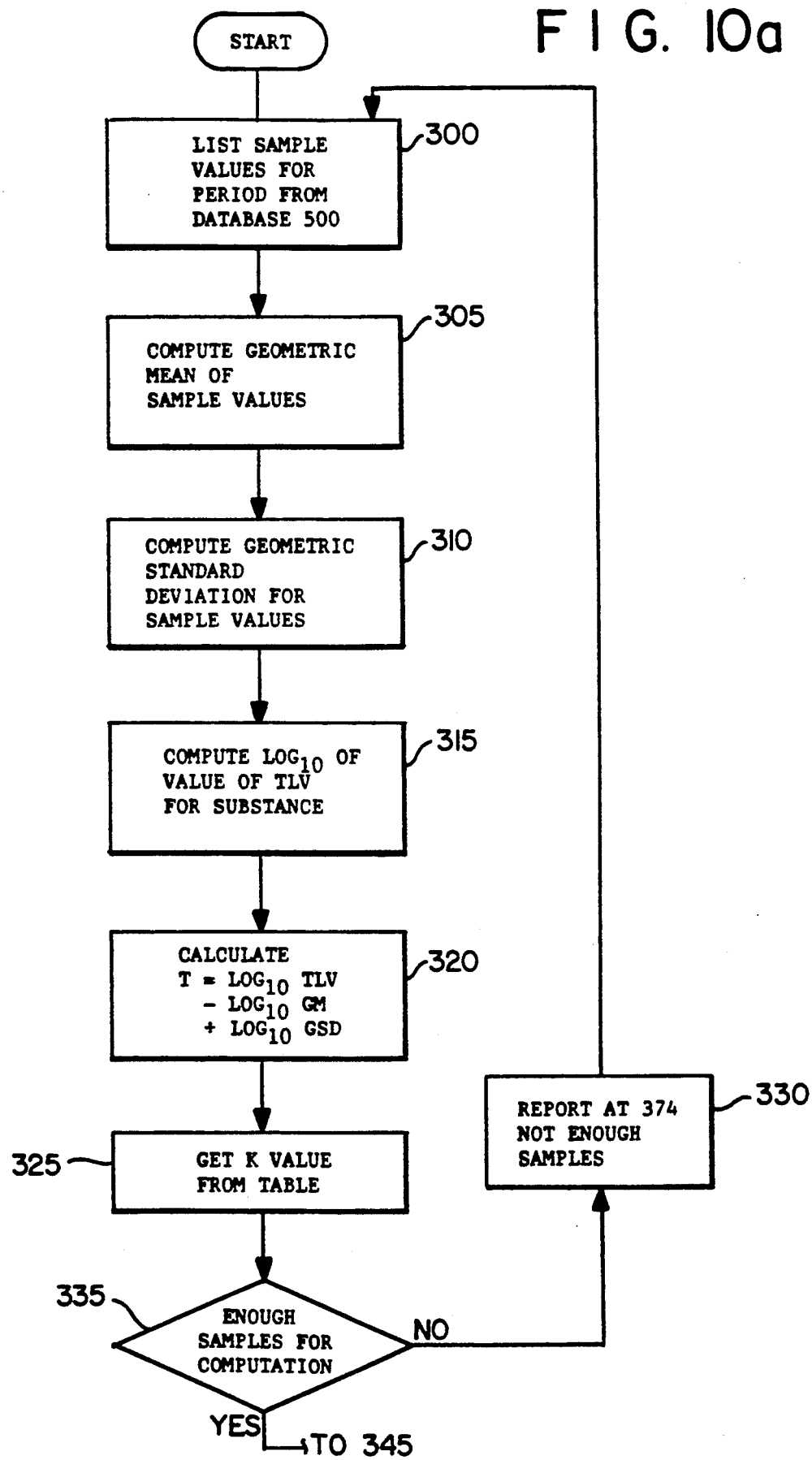
FIGS. 10(a) and 10(b) constitute a flow chart for the computation of estimates of estimated optimum test sampling frequency.
Figure 10B:
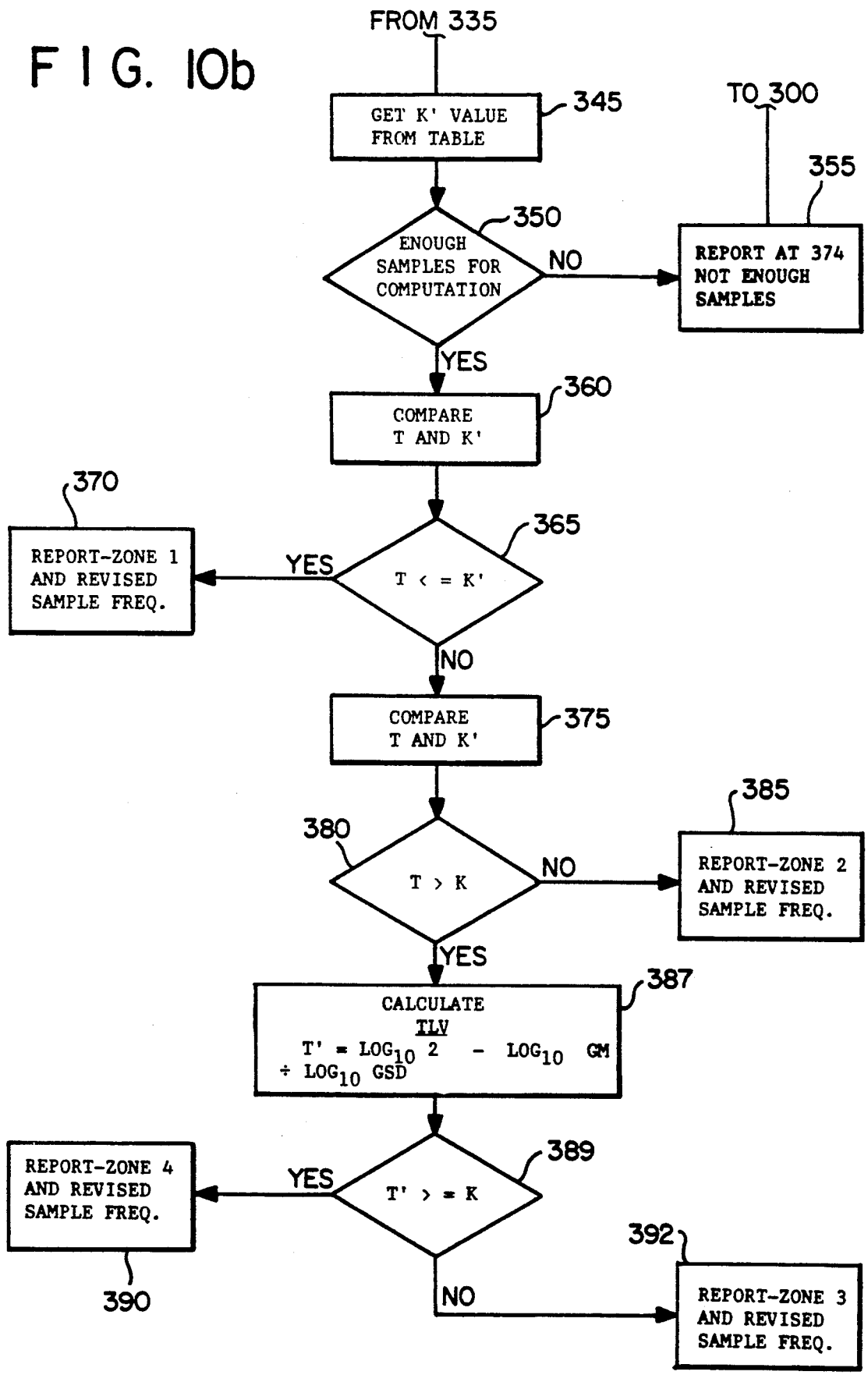

When the value for T lies in ZONE 3, indicating employee exposure to be below the TLV, then further data analysis is performed by calculating a T' value as follows:

$$T' = \frac{\text{Log}_{10}(\frac{1}{2}TLV) - (\text{Log}_{10} GM)}{\text{Log}_{10}(GSD)}$$

and if T' > K then Zone 4 (a subzone of Zone 3) is assigned which specifies a reduced level of sampling frequency in view of the low measured values of a potentially hazardous substance. The value obtained for "T" is compared by microprocessor 10 under the guidance of the software and data entry and system control 100 in the manner illustrated in the Flow Chart of FIG. 10 where the individual sampling values are listed at 300; the geometric mean of these values is calculated at 305; and the geometric standard deviation is calculated at 310. Applicable logarithmic functions and manipulations occur at 315 and 320 and K and Kp(K') values are extracted at 325 and 345 and if enough samples have been taken to support computation, as indicated at 350, a comparison with the parameter T is made at 360 and 375, and with T' at 389 after calculation at 387 and the applicable zone is reported at either 370, 385, 390 or 392 together with the estimated frequency of sampling from the zone table of FIG. 3(d). This is reported, for example, at 372, 372' and 374, 374' in reports 370, 370' of FIGS. 9(e) and ((f). Also shown in the reports of 370, 370' are the measured sample values 701, the calculated values for the geometric mean, standard deviation and T or T', whichever is applicable at 703, 705, 707. In the report 370 of FIG. 9(e), five (5) samples were subject to analysis and the K factor utilized is "4.202" and K' is "0.817"; in the report 370' of FIG. 9(d) six (6) samples were subject to analysis and the K factor is "3.707" and K' is "0.875". The K and K' values, being statistically developed one sided tolerance factors, are not displayed on the reports since they are not as meaningful as the geometric mean and standard deviation calculated values. For the values shown, in FIG. 9(e) the zone is "1" and unsatisfactory, and a more stringent test frequency of (3) samples every six months is the recommended estimate as part of the monitoring strategy. In the example of FIG. 9(f) the zone is "3" which is "acceptable" and the originally set frequency of "5" (FIG. 6(c)) is reduced by keyboard entry or alternatively by automatic operation of the computer to 1 sample per year as part of monitoring strategy in view of the measured test values. The new sampling frequency then replaces the frequency stored in the memory of the computer for database 400 and the record 500 for the particular substances and the measured sample data for the subsequent selected sampling planning period is used for the above described computations.

In addition to reporting a new sampling frequency based upon analysis of sample data, the menu commands of FIGS. 8(a) and 8(b) provide report 320 of FIG. 8(c) which for each site location (area 1 etc.) displays the currently applicable sampling frequency strategy for each potentially hazardous substance; the TLV for the substance is automatically generated from risk table 202. By selection of a "sort" from the menu of FIGS. 8(d), (e), (f), (g) the exposure of individual employees for specific potentially hazardous substances at a particular site location is provided as represented in FIG. 9(a) and in FIG. 9(b) exposure for an individual employee is provided for the potentially hazardous substances and the various site locations. The report 360 of FIG. 9(d) is generated each time a sample value is entered at 620 in a record of 500 of database 400 and automatically entered in database 402 at 703'. The report 360, in hard copy is sent to the employee for signature acknowledgement and a hard copy is also kept in management files.

Figure 11:
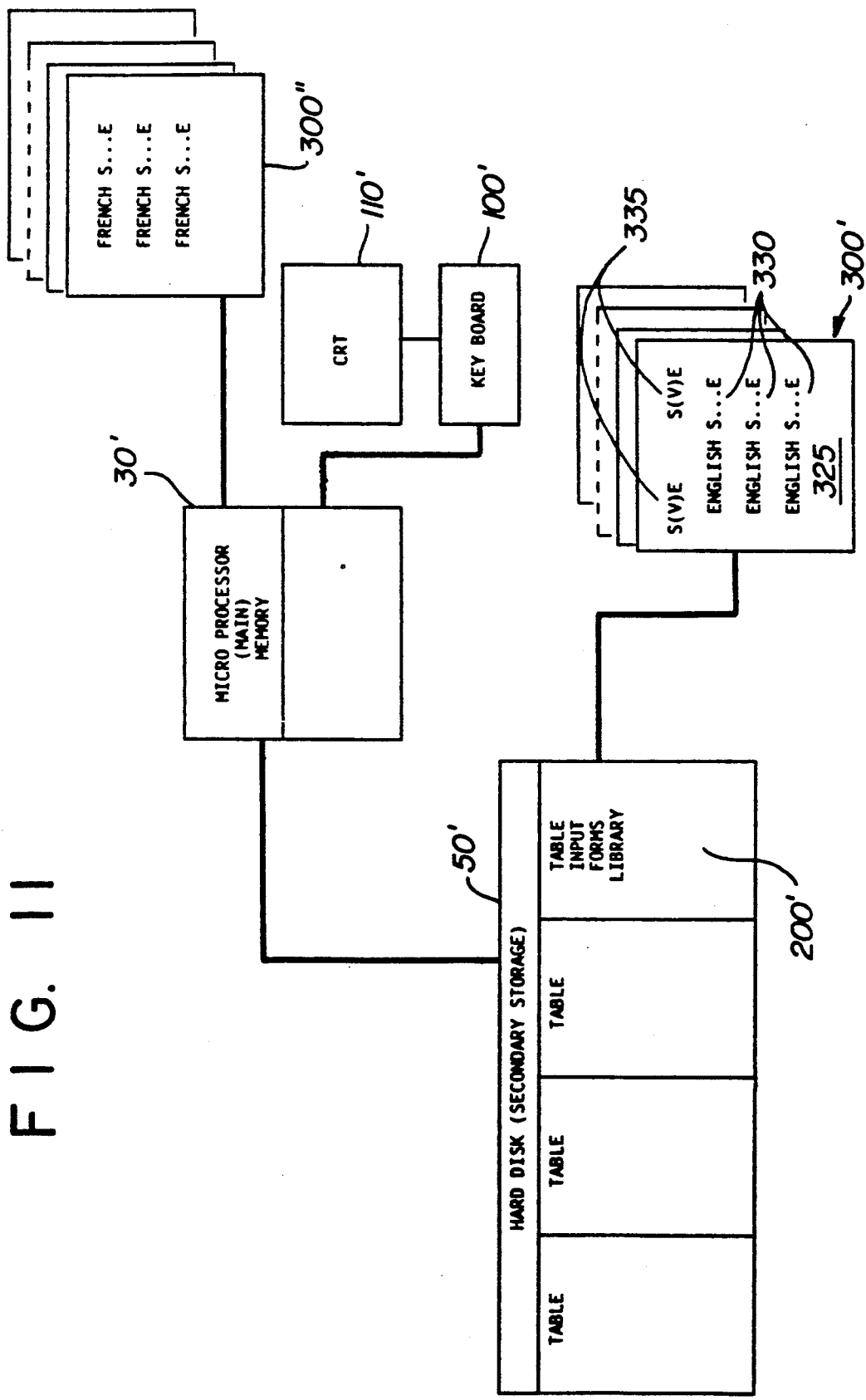
FIG. 11 is a block diagram of the hardware and software control which includes the text translation embodiment of the present invention.

In a further embodiment of the present invention, the computerized system of the present invention enables the direct translation of the English (or other initial text language) text in the previously created forms, e.g. input screens, menus, report formats, at an industrial site location by data entry personnel using only keyboard entry of translated text without the need for such personnel to use any program language or commands for this purpose. The translation can be essentially "word-for-word", or text can be re-arranged, or some portions of the initial text deleted and new text added. Fields for entry of input data can be re-defined, i.e. adjusted in size and re-located in different columns; fields defined for variables such as site location code, date should not be changed, and all variables, for all forms, are defined (set) by an independently created data base software application which is used together with subroutines of the data base creation and management software, e.g. application generators such as "Forms Express"*, Applications Express, of R:Base* With reference to FIG. 11, this is accomplished by a computerized system in which, for example, the contents of forms library 200', i.e., forms 300', are copied from secondary storage 50 and translated at keyboard 100' to provide translated forms 300''.

* Trademark of Microrim, Inc. Forms 300' were originally created using an application of the relational data base creation and management software as hereinbefore described and when created were unloaded from computer main memory 30 and stored in forms library 200' at the system hard disk 50. (secondary storage). The text of the forms, e.g. indicated at 325 is in the initially desired language, in the example illustrated it is in English. In order that the system of the present invention be efficiently utilizable on a world-wide basis, an application has been created in a manner such that the text of the forms in library 200' can be translated, one-at-a-time, into any other language, e.g. French, using only keyboard 100' in conjunction with CRT 110 to re-type text in the new language, e.g. French. The text can be translated "word-for-word" or re-arranged as desired, as can the initially defined data entry fields 330 marked "S . . . E". The fields 335 marked "S V E" for variables such as site location code, date, should not be changed and these fields are automatically defined by an independently created routine prior to form text translation so that the keyboard operator does not have to be concerned with programming, i.e. setting, these fields and need only translate the English text. After the translated forms 300'' are initially created in the relational database in the computer main memory as hereinabove described, the created forms are stored (saved) as a table in the library 200' of forms 300' which is stored at hard disk 50' and the forms 300'' overlay the original forms 300 at hard disk 50 and are ready to be copied back, one at a time, with the new language text to the relational data base when data is to be inputted by way of the form to a data base, e.g. 401 of FIG. 2, by operation of keyboard 110'. System variables such as date, site location code 105 are also stored in a table at hard disk 50 and can be retrieved and re-set for edited forms.
* Trademark of Microrim, Inc.

In the practice of the present invention, when it is desired that the language of a text of the forms in the library be changed, e.g. from English to French, the library 200' comprising a set of forms which is resident in secondary storage at hard disk 50' is copied, one form (table) at a time, to the relational data base in main memory 30'. The fields for variable values for all forms are defined (set) by a routine by which values of the previously defined system variables are retrieved from a table in computer memory. That is, the computer is instructed by an independently created application to read a copy of each of the forms of library 200' from hard disk 50' to the relational data base management software program in main memory (RAM) and to define fields for all variables for all forms in such program where they are subject to control by the relational data base, e.g. R:Base* Each form, or table, 300' of the library 200', is successively displayed at CRT 110 in the edit mode and the English text is "typed over" in the new language, e.g. French. That is, the old text, English, is deleted and the new text, French, is inserted. All text and fields can be edited without risk of causing an error condition, except the fields 335 which have been defined for the system variables which are defined (set) for the edited forms by the independently created application.

* Trademark of Microrim, Inc.

When the desired replacement of text has been accomplished for the forms, e.g. tables, of the library copied from the hard disk 50' to the relational data base, e.g. R:Base*, the library, now revised, is unloaded, one form at a time, from R:Base* in the computer main memory 30' to the secondary storage of hard disk 50 (where the revised, translated forms overlay the original forms) from which the revised, new language forms can be returned to the relational data base and of FIG. 2.

* Trademark of Microrim, Inc.

Figure 12A:
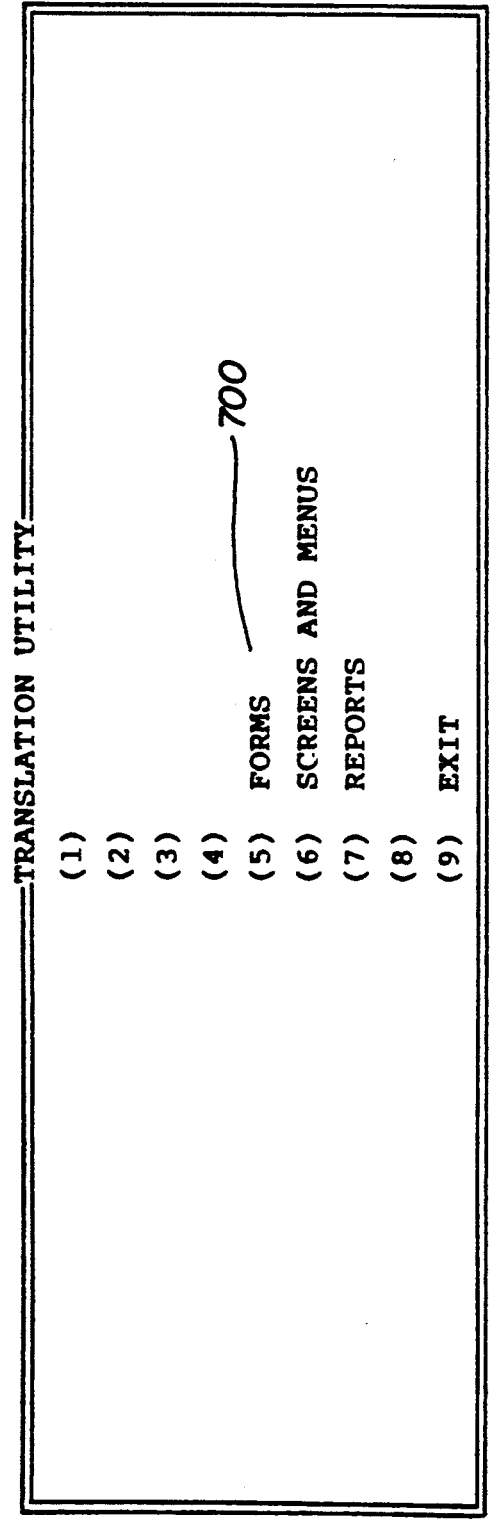
FIGS. 12(a)–(c) show a sequence of screens for menu commands of the text translation embodiment of the present invention.
Figure 12B:
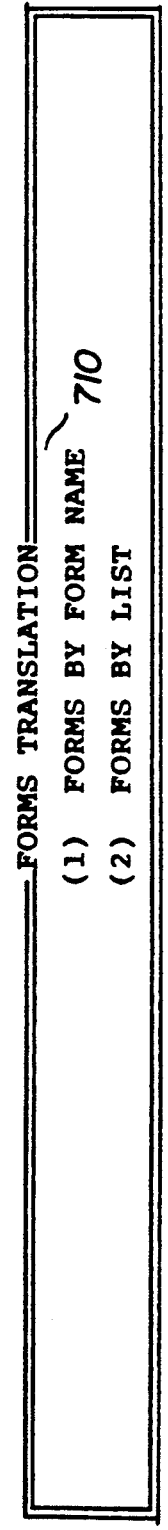
Figure 12C:
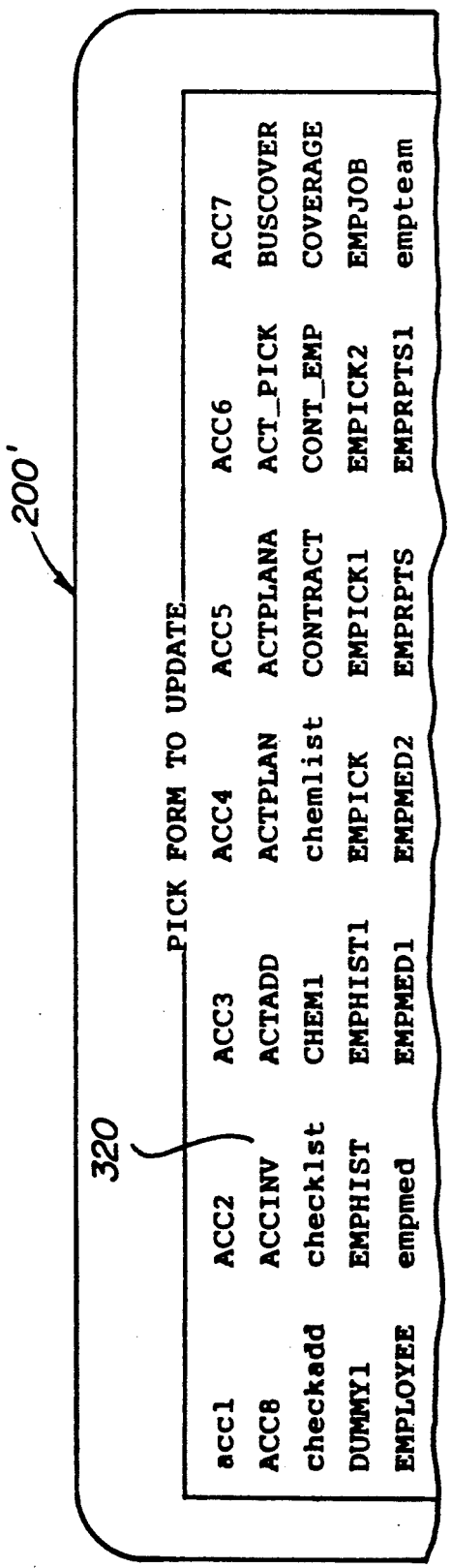
Figure 15A:
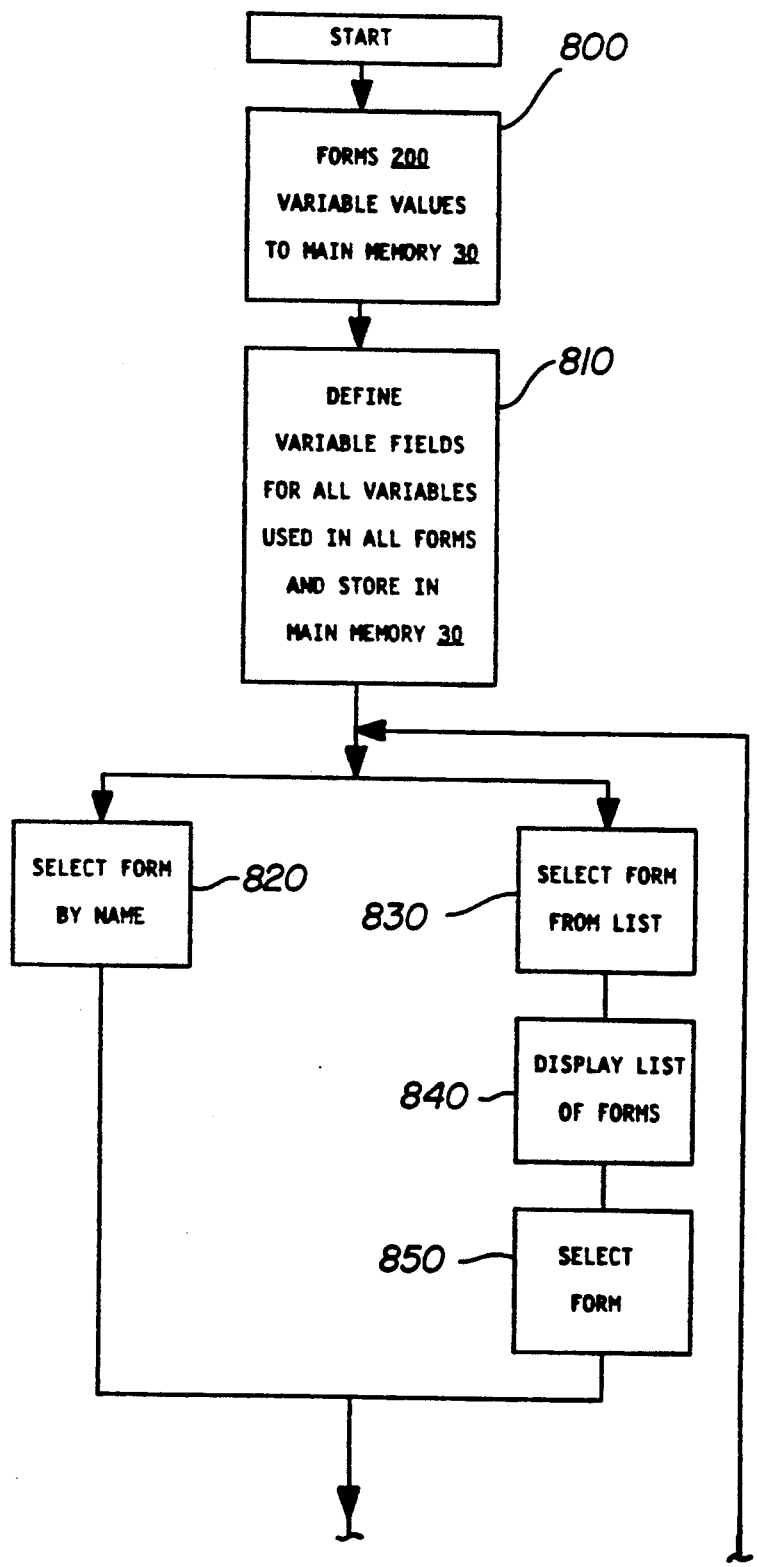
FIG. 15 (a) and 15(b) constitute a flow-chart for the text translation embodiment of the present invention.
Figure 15B:
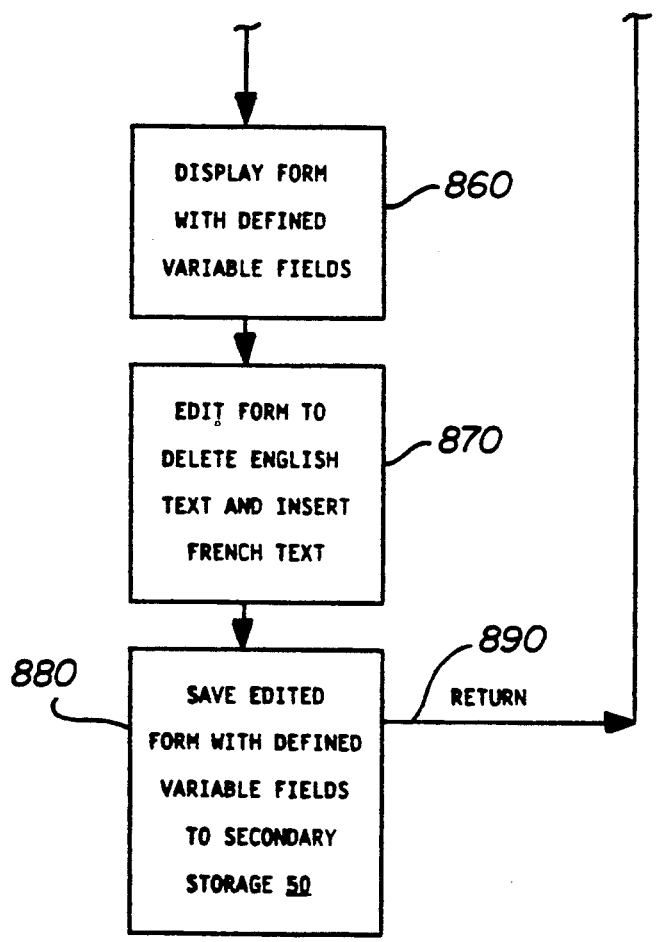

With reference to FIGS. 12(a)-(c) these figures illustrate menu commands and prompts which are created, for the databases involved, using a subroutine developed from an application of the data base creation and management software; in the use of R:Base* (Microrim) it is "Application Express"* as hereinabove described. With reference to FIG. 12(a), by way of example, form "700'" is selected as the menu command followed either by Forms By Name "710? (if known) or Forms By List "720" of FIG. 12(b) to see the list (library) of forms 200'' stored at hard disk 50' of computer memory. By "picking" the form 320 of FIG. 12(c) this form is copied from library 200' of hard disk 50' to processor main memory 30' and displayed at CRT 110' with English language text as indicated at 325 of FIG. 13. By selecting the Edit command 340 of the relational data base software the system is in the edit mode and text 325 can be translated and added to the form, or deleted from the form, and/or re-arranged as desired. Data input fields 330 can also be changed and re-located but changing the variable fields 335 should be avoided so that possibility of causing an error condition is eliminated. FIG. 14 illustrates the form 320' after the English language text has been edited and replaced by French and input data fields 330' re-defined. When the translation and revision of the form 320' is satisfactorily completed, leaving (escape) the edit mode will present the option 360 of saving the revised, translated form to the hard disk 50'. Exercise of this command will overlay the revised, translated form 320' over original form 320 at the hard disk 50' so that a future "pick" of form 320 from the list of FIG. 12(c) will result in copying of the revised, translated form to the relational data base software in computer main memory 30'. FIG. 15 is a flow-chart which under the guidance of system control 100 and system software copies at 800 forms from the hard disk 50 to computer main memory 30'; variable values are also copied from a table at hard disk 50 to computer main memory. The computer is instructed by an independently created application to define the fields for all variables for all forms and store in computer main memory as indicated at 810. Forms from computer main memory are selected one at a time either by name using the menu command at 820 or from a list using the sequence of menu commands 830, 840, 850. The selected form is displayed and this form has defined field (860). As shown at 870 the form is subsequently in the Edit mode and English text is deleted and substitute French text is inserted. The edited form is unloaded as a table to an open data base in secondary storage and saved at hard disk 50 and overlays the unedited English language form (table). Since the variable fields have been defined in the edited form, the possibility of an error condition for the edited form is eliminated and the edited, translated form can be copies back to computer main memory for data entry. A return command 890 enables the selection of another form for translation.

* Trademark of Microrim, Inc.

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

What is claimed is:

1. Method for adjusting the test sampling frequency of tests conducted to detect the presence of a plurality of potentially hazardous substances at one or more of a plurality of designated physical locations of an industrial site based upon testing the ambient environment at the respective designated locations and recording measurable amounts of such potentially hazardous substances for each such locations respectively; said method comprising:

(i) providing in the memory of a computer processor a library including (a) a risks table containing a listing of a plurality of specific potentially hazardous substances each with an accompanying numerical substance hazard rating with higher individual numbers in the range indicating a different degree of risk and each with an accompanying numerical maximum tolerance level value and units of measure therefor; (b) a tolerance factors table containing a record of numerical data values defining at least two discrete, non-contiguous zones of a cartesian graphical plot representing estimates of different levels of potential hazardous substance exposure risk as determined by a number of test values which at least exceeds a pre-determined threshold number of test values (c) a zone, risk and sample frequency table containing a recommended frequency, expressed as a number per period of time of test sampling for each substance hazard rating for each of said levels represented by said zone; (d) an employee profiled table containing the name, address and designated industrial site location of employment; (e) a substance inventory table containing a record for each substance of the risks table which is present at the designated locations of the industrial site and containing a pre-determined test sampling frequency for each substance;

(ii) testing for the presence of a potentially hazardous substance of said risks table, which is in the substance inventory table in the memory of the computer, at a designated location of the industrial site at said pre-determined frequency and inputting and storing a first and each subsequent value of the amount of said substance obtained from said testing at said pre-determined frequency in a separate employee history table for each employee at each designated location in the memory of said computer until the number of stored values obtained from said testing is at least equal to said threshold number said computer generating a unique identification designation for each individual substance tested and entering this designation in each of the employee profile, substance inventory and employee history tables and generating a test value notification document for each employee at a designated location;

(iii) utilizing said computer to (a) compute a mean value and a standard deviation of said stored values obtained from testing of a substance as an estimate of the amount of said substance present at a said designated location of said facility and to compute a numerical parameter relating such mean and standard deviation values to the tolerance level value of said substance in the memory of the computer (b) and compare said parameter with the numerical data values defining said discrete zones and utilize the result of such comparison to compute a revised test sampling frequency estimate for the designated location based upon the estimated level of potential exposure for such site and updating the test sampling frequency for each site depending upon the history table for the designated employee at such site.

2. Method in accordance with claim 1 wherein the previous test sampling frequency is automatically deleted from the substance inventory table upon display of said revised test sampling frequency.

3. The method of claim 1 wherein said computer processor further comprises software programs for providing environmental database management reports based upon the frequency of said test sampling and wherein the language of the text of said tables may be converted from one language of another for use with said software programs independent of the language of the software programs in said processor comprising the steps of storing all of said tables in computer memory in a library of tables separate from said computer programs with all variable values for the computer programs defined and stored separately in memory such that upon the selection of a specific table said table may be translated line by line into another language and inserted into memory in the new language in direct substitution for the table information in the original language.

* * * * *

UNITED STATES PATENT AND TRADEMARK OFFICE
CERTIFICATE OF CORRECTION

PATENT NO. : 5,105,365

DATED : April 14, 1992

INVENTOR(S) : Timothy E. McDaniel, Gerard W. Langton, Bruce P. Coleman and Chester A. Roberts It is certified that error appears in the above-identified patent and that said Letters Patent is hereby corrected as shown below:

Column 9, line 32, delete footnote "*Trademark of Microrim, Inc." and continue rest of paragraph in regular type style and size.

Column 10, line 29, ""710?" should read --"710"--.

Column 11, line 50, "profiled" should read --profile--.

Column 12, line 45, "of" should read --to--.

Signed and Sealed this

Sixth Day of July, 1993

Attest:

MICHAEL K. KIRK

Attesting Officer

Acting Commissioner of Patents and Trademarks